United States Patent [19]

Huschke

[11] 4,449,392

[45] May 22, 1984

[54] DEVICE FOR TESTING FILTERS, PARTICULARLY STERILE FILTERS

[76] Inventor: Bruno Huschke, Hauptstr. 12, D-8931 Reichertshofen, Fed. Rep. of Germany

[21] Appl. No.: 373,309

[22] Filed: Apr. 29, 1982

[30] Foreign Application Priority Data

May 2, 1981 [DE] Fed. Rep. of Germany ....... 3117399

[51] Int. Cl.³ ............................................. G01M 3/26
[52] U.S. Cl. ............................................. 73/40; 73/38
[58] Field of Search ................................. 73/40, 38, 37

[56] References Cited

U.S. PATENT DOCUMENTS 3,336,793 8/1967 Tuttle ..................................... 73/40

*Primary Examiner*—Gerald Goldberg
*Assistant Examiner*—Joseph W. Roskos
*Attorney, Agent, or Firm*—Flynn, Thiel, Boutell & Tanis

[57] ABSTRACT

A filter testing device has a filter housing which has an air inlet and outlet and receives the filter. An inlet line is connected to the air inlet. An inlet valve for the inlet line is controlled to produce a continuous and evenly increasing air pressure therein and an electronic pressure sensor monitors the air pressure therein. An electronic evaluating and control circuit has a time switch, an adjustable threshold device and a peak pressure detector, and controls the inlet valve, a vent valve connected to the inlet line, and a recording mechanism. The air pressure in the inlet line is increased until it reaches a preset pressure. The inlet valve is then closed for the time period set on the time switch. Thereafter, air is again supplied to the inlet line until no further pressure increases are detected by the peak pressure sensor.

7 Claims, 3 Drawing Figures

DEVICE FOR TESTING FILTERS, PARTICULARLY STERILE FILTERS

FIELD OF THE INVENTION

This invention relates to a device for testing filters, particularly sterile filters, and more particularly to a filter testing device which includes a housing having an air inlet and air outlet and adapted to receive the filter being tested, an inlet line connected to the air inlet, the air pressure in which can be regulated by an inlet valve, and a recording mechanism.

BACKGROUND OF THE INVENTION

In filter testing, filters are subjected to a so-called pressure-resisting test at a predetermined pressure by a testing device. The sealing of the filter, which has previously been wetted with a liquid such as water, is tested by the presence or absence of air leakage therethrough. The filter is subsequently subjected to a test for determining its so-called "bubble point". Upon reaching the bubble point pressure, the pressurized air will flow freely through the filter. This pressure measured upon reaching the bubble point is in effect a measurement for pore size, according to which filters are classified. Also, when a filter is dirty, one can determine the degree of dirt present, since partially clogged pores increase the pressure of the bubble point.

A testing device of the above-mentioned type is known from German GM No. 79 31 402 and includes a testing apparatus which is partially filled with water and is connected to the air outlet of the filter housing during testing of a filter. An inlet valve is manually opened until the appropriate pressure-resisting test pressure is reached, which pressure can be read from a manometer which is provided on the filter housing. Based on air bubbles which rise from the liquid upon reaching of the pressure-resisting test pressure, conclusions are supposed to be drawn concerning the sealing of the filter. This optical testing method is complicated, time consuming and inexact. Thereafter, through further opening of the inlet valve, which is supposed to be carried out slowly and evenly, the air pressure is increased until the operator recognizes the "bubble point" through increased air bubble formation in the testing apparatus, and then the associated pressure must be read from the manometer. This is also complicated, time consuming and inexact.

It has also been suggested that the liquid reservoir of the testing apparatus can be constructed as a venturi pipe, which in its constricted area has electrodes which are connected to an ohmmeter and measure the conductivity of the water in the liquid reservoir. The conductivity of the water in the liquid reservoir is relatively high in the absence of bubble formation, while increasing bubble activity causes the conductivity to drop, the increasing resistance being readable on the ohmmeter. The ohmmeter is preferably coupled with a recording mechanism, for example a recorder which graphically registers conductivity and thus bubble activity. This method of measuring bubble activity is also inexact and has not been particularly successful in practice, because the exact bubble point pressure can only be determined by visually reading the manometer.

Problems also arise when, according to known testing methods, sterile filters must be tested. Since testing takes place at the outlet of the filter housing, and thus at the sterile side, the danger of a secondary contamination exists. To avoid this secondary contamination, the known testing devices are equipped with additional filter surfaces, which are constructed partly moisture-repellent and partly hydrophilic. This results in disadvantages, including higher manufacturing expenses.

One basic purpose of the invention is therefore to provide a filter testing device of the above-mentioned type, particularly for sterile filters, which operates precisely, quickly, and substantially automatically, which provides reproducible results, thereby permitting a precise recording of the pressure-resisting test pressure and the bubble point pressure, and which, in the case of a sterile filter, avoids in a simple manner any secondary contamination.

SUMMARY OF THE INVENTION

The testing device according to the invention comprises a pressure-regulating mechanism for producing a continuous and evenly increasing pressure in the inlet line which includes an electronic pressure sensor which monitors the air pressure in the inlet line, an electronic evaluating and control circuit having a time switch, an adjustable threshold device for effecting pressure adjustment and a peak pressure value sensor, the evaluating and control circuit controlling the inlet valve, a vent valve which is connected to the inlet line, and a recording mechanism. The control circuit controls the pressure-regulating inlet valve so that the air pressure is increased in the inlet line until it reaches a predetermined pressure-resisting test pressure which can be adjusted by means of the adjustable threshold device. The inlet valve is then closed until the time set on the time switch expires, and a further increase of the air pressure in the inlet line is then effected until the peak pressure value sensor determines no further air-pressure increase is occurring, indicating the bubble point has been reached. The peak pressure value sensor then causes the control circuit to open the vent valve and simultaneously close the inlet valve.

In contrast to conventional testing devices, the inventive testing device is connected only to the inlet side of the filter housing, which immediately ensures that sterile filters will not be subject to secondary contamination. Moreover, the pressure conditions in the inlet line are regulated automatically, so that the operator is substantially omitted and the test results no longer depend on the conscientiousness of the operator. Also, the bubble point pressure is detected very precisely by means of the peak pressure sensor. Not only this, but the pressure-resisting test pressure and the entire pressure curve can be precisely recorded by the recording mechanism, which is preferably a graphical recorder. Through the precise and automatic operation of the inventive testing device, testing can be reliably repeated at any time under the same test conditions.

BRIEF DESCRIPTION OF THE DRAWINGS

An exemplary embodiment of the invention will be discussed in greater detail in connection with the drawing, in which.

DETAILED DESCRIPTION

Figure 1:
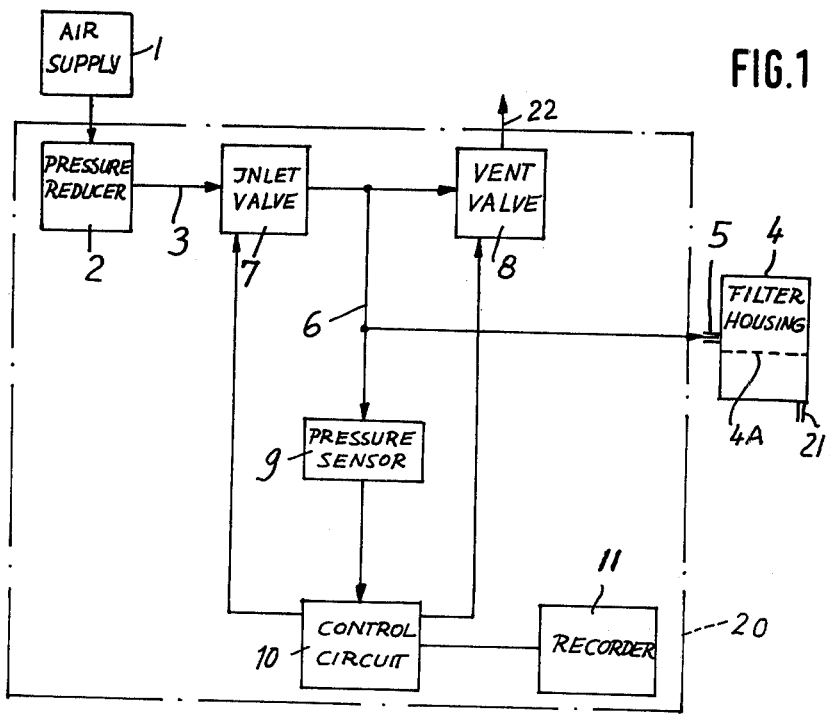
FIG. 1 is a block diagram of a filter testing apparatus embodying the present invention.
Figure 3:
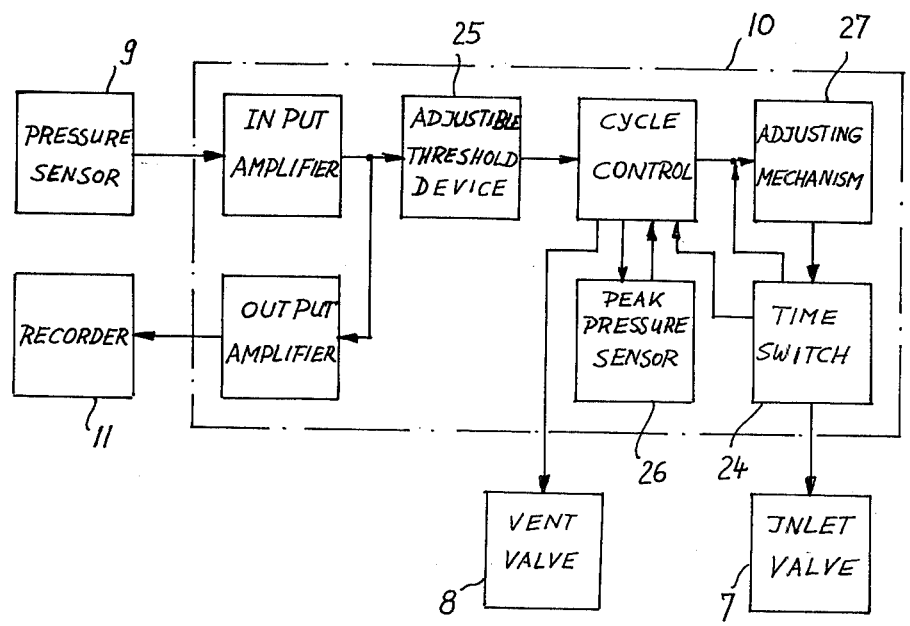
FIG. 3 is a block diagram of the evaluating and control circuit.

Referring to FIG. 1, the testing device 20 can be connected to a conventional compressed-air source 1 through a pressure reducing and regulating device 2 which provides a constant pressure in the line 3. The conventional filter 4a which is to be tested is arranged in a filter housing 4 so as to obstruct air flow between an inlet 5 and outlet 21 thereof. The air inlet 5 of the filter housing 4 is connected to an inlet line 6. An electrically activated inlet valve 7, which is preferably a pulsating valve (a pulse valve or timing valve), is provided between the line 3 and the inlet line 6. Furthermore, a vent valve 8 and an electronic pressure sensor 9 are connected to the inlet line 6. The electronic pressure sensor is connected to an electronic evaluating and control circuit 10. The electronic evaluating and control circuit 10 includes an adjustable time switch 24 (FIG. 3), an adjustable threshold device 25 for effecting pressure adjustment, and a peak pressure sensor 26. The evaluating and control circuit 10 is coupled to a recording mechanism 11, which is preferably a conventional graphical recording device. The evaluating and control circuit 10 is designed so that a continuous and even pressure is provided in the inlet line 6. This is advantageously effected by appropriate electrical control of the inlet valve 7.

The evaluating and control circuit 10 has an adjusting mechanism 27 for controlling the operation of the inlet valve 7 and thus the volume of air entering the inlet line 6. More specifically, it is possible to adjust the frequency and keying ratio of the inlet valve 7 by means of the adjusting mechanism 27.

Furthermore, it is advantageous if, by means of the adjusting mechanism and with respect to the rate of air flow into the line 6 at the start of the pressure-resisting test, the rate of air flow into the inlet line 6 can be reduced automatically after the pressure-resisting test has ended and until the bubble point has been reached.

The vent valve 8 is normally closed. When opened, it will vent air in the line 6 to the atmosphere through an outlet 22.

After the inlet line 6 of the inventive testing device 20 has been connected to the inlet 5 of the filter housing 4 and operation of the device 20 is initiated, the inventive testing device 20 will operate substantially automatically, as follows.

Figure 2:
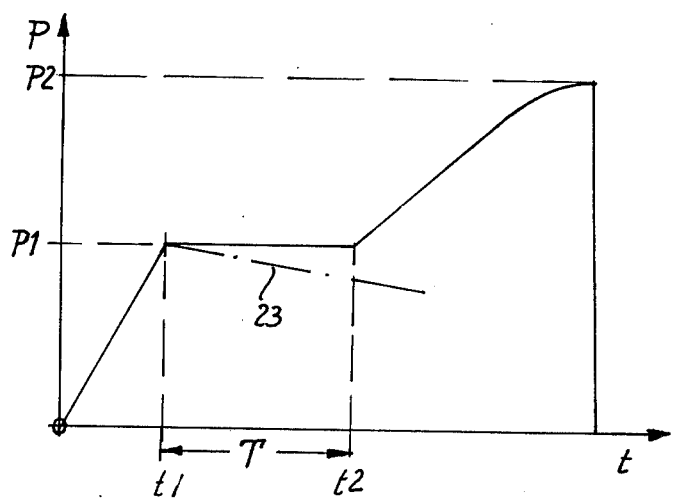
FIG. 2 illustrates a typical pressure curve recorded by a recording mechanism which is a component of the apparatus of FIG. 1.

The inlet valve 7 is repeatedly opened and closed by the electronic evaluating and control circuit 10, which causes the air pressure in the inlet line 6 to increase continuously and evenly until the preselected pressure, namely the so-called pressure-resisting test pressure, is reached at time t1 (FIG. 2). This pressure is identified with P1 in the pressure curve illustrated in FIG. 2. When the threshold device 25 indicates the pressure-resisting test pressure P1, preselected by adjustment of the threshold device 25, has been reached, the inlet valve 7 is closed by the electronic evaluating and control circuit 10 and, for a predetermined period of time T which can be adjusted by means of the time switch 24, the inlet valve 7 is kept closed. If the filter being tested is leakproof, then during the time T a drop in pressure in the line 6 will not occur. The portion of the curve on the graph produced by the recording mechanism 11 for this period of time will then extend, as can be seen from FIG. 2, parallel to the time axis t. However, if the filter is not leakproof, then the pressure in line 6 will drop, as indicated by the dash-dotted line 23, and through its slope one can determine the leakiness of the filter. After the time T controlled by the time switch 24 expires, namely at time t2, the pulsating inlet valve 7 is again actuated. In order to determine the bubble point as precisely as possible, the rate of air flow into the inlet line 6 after time t2 is less than the rate prior to time t1. This is done by automatically reducing the frequency and keying ratio of the signal controlling the valve 7. The term keying ratio is used to refer to the relationship between the open time and the closed time of the valve 7. When it is determined that no further pressure increase is occuring, the the bubble point has been reached. The absence of any further pressure increase is detected by the peak pressure value sensor 26 in the circuit 10, for example a differentiation circuit. The peak pressure value sensor 26 then causes the circuit 10 to open the vent valve 8 and close the inlet valve 7. The bubble point pressure P2 can easily be read from the curve which has been recorded on the recording mechanism 11. The testing of the filter has thus been completed and can be reliably repeated at any time under the same testing conditions.

Should another filter need to be tested using a different pressure-resisting test pressure, then the preselected pressure-resisting test pressure can be modified by adjusting the adjustable threshold device. Since the rate of air flow into the inlet line 6 is controlled by the evaluating and control circuit 10, it is furthermore possible to adjust the testing device for various filter sizes.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for testing a filter, including a filter housing having an air inlet and an air outlet and adapted to receive a filter which is to be tested, an inlet line connected to said air inlet, the air pressure in said inlet line being regulated by an inlet valve, and means for recording the air pressure in said inlet line; the improvement comprising: pressure-regulating means capable of producing a continuous and evenly increasing air pressure in said inlet line, including an electronic pressure sensor which monitors the air pressure in said inlet line, an electronic evaluating and control circuit having a time switch, an adjustable threshold device for effecting pressure adjustment and a peak pressure sensor, said evaluating and control circuit controlling said inlet valve and being responsive to said electronic pressure sensor, said adjustable threshold device and said peak pressure sensor; and including a vent valve which is connected to said inlet line and said recording means and is controlled by said evaluating and control circuit; said pressure regulating means causing the air pressure to increase in said inlet line until it reaches a preselected pressure-resisting test pressure which can be adjusted by means of said adjustable threshold device, said inlet valve then being closed by said pressure regulating means for a time interval set on said time switch, a further increase of the air pressure in said inlet line then being effected by said pressure regulating means until said peak pressure sensor indicates no further air-pressure increase is occurring, thereby indicating a bubble point has been reached, said peak pressure sensor then causing said evaluating and control circuit to open said vent valve and simultaneously close said inlet valve.

2. The device according to claim 1, wherein said evaluating and control circuit has adjusting means for adjusting the rate of air flow into said inlet line.

3. The device according to claim 2, wherein said adjusting means automatically effects a rate of air flow into said inlet line, after the pressure-resisting test is finished and until said bubble point is reached, which is less than the rate of air flow into said inlet line before said preselected pressure-resisting test pressure was reached.

4. The device according to claim 1, wherein said inlet valve is a pulsating valve.

5. The device according to claim 4, wherein said evaluating and control circuit includes an adjusting mechanism, and wherein the frequency and keying ratio of a signal from said evaluating and control circuit which controls said inlet valve can be changed by said adjusting mechanism.

6. The testing device according to claim 1, wherein said time interval set on said time switch can be adjusted.

7. A method of testing a filter using an apparatus which includes: a filter housing having an air inlet and an air outlet and adapted to receive a filter to be tested; an inlet line connected to said air inlet, the air pressure in said inlet line being regulated by an inlet valve; means for recording the air pressure in said inlet line; pressure regulating means which includes an electronic pressure sensor responsive to the pressure in said inlet line, an electronic evaluating and control circuit having a time switch, an adjustable threshold device, and a peak pressure sensor, said evaluating and control circuit controlling said inlet valve and being responsive to said electronic pressure sensor, said adjustable threshold device and said peak pressure sensor; and a vent valve which is coupled to said inlet line and is controlled by said evaluating and control circuit; comprising the steps of: causing said pressure regulating means to increase the air pressure in said inlet line until it reaches a preselected pressure-resisting test pressure which can be adjusted by means of said adjustable threshold device; thereafter causing said pressure regulating means to close said inlet valve for a time interval set on said time switch; thereafter causing said pressure regulating means to further increase the air pressure in said inlet line until said peak pressure sensor indicates no further air pressure increase is occurring, thereby indicating a bubble point has been reached; and thereafter causing said pressure regulating means to open said vent valve and simultaneously close said inlet valve.

* * * * *